(12) United States Patent
Jafari et al.

(10) Patent No.: US 8,391,356 B1
(45) Date of Patent: Mar. 5, 2013

(54) SCALABLE VIDEO CODING PRIORITY MARKING

(75) Inventors: Reza Jafari, Olathe, KS (US); Shingara Dhanoa, Overland Park, KS (US); Mohammed Ghouse Mohiuddin, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 582 days.

(21) Appl. No.: 12/372,931

(22) Filed: Feb. 18, 2009

(51) Int. Cl.
H04N 7/12 (2006.01)
(52) U.S. Cl. .................................. 375/240.01
(58) Field of Classification Search ............ 375/240.01, 375/240
See application file for complete search history.

(56) References Cited

U.S. PATENT DOCUMENTS

| | | | |
|---|---|---|---|
| 2006/0083309 A1* | 4/2006 | Schwarz et al. | 375/240.16 |
| 2008/0007438 A1 | 1/2008 | Segall | |
| 2009/0187960 A1* | 7/2009 | Lee et al. | 725/131 |

OTHER PUBLICATIONS

Charles Krasic, et al., Quality-Adaptive Media Streaming by Priority Drop, International Workshop on Network and Operating System Support for Digital Audio and Video archive Proceedings of the 13th international workshop on Network and operating systems support for digital audio and video table of contents, Monterey, CA, USA, pp. 112-121, Year of Publication: 2003, ISBN:1-58113-694-3 http://portal.acm.org/citation.cfm?id=776322.776341&coll=GUIDE &dl=GUIDE.
Eleftheriadis, Alexandros, System and Method for Management of Scalability Information in Scalable Video and Audio Coding Systems Using Control Messages, Apr. 10, 2007, http://www.wipo.int/pctdb/en/wo.jsp?WO=2007112384.

* cited by examiner

Primary Examiner — Techane Gergiso (57) ABSTRACT

Systems, methods, and computer-readable media for assigning priority to scalable video codings are provided. In one method, the dependency_id, quality_id, and temporal_id of a NAL unit header is used to calculate the priorty_id for the NAL unit header. In another method, the DiffServe field of an IP packet is modified based on the priority markings of the NAL unit header to provide different levels of assured forwarding.

12 Claims, 7 Drawing Sheets

SCALABLE VIDEO CODING PRIORITY MARKING

SUMMARY

Embodiments of the invention are defined by the claims below, not this summary. A high-level overview of various aspects of the invention are provided here for that reason, to provide an overview of the disclosure, and to introduce a selection of concepts that are further described below in the detailed-description section below. This summary is not intended to identify key features or essential features of the claimed subject matter, nor is it intended to be used as an aid in isolation to determine the scope of the claimed subject matter.

Accordingly, in one embodiment, an aspect of the present invention is directed to computer-storage media storing computer-useable instructions for causing a computing device to perform a method for assigning priority to a video packet. The method includes having a first layer-type and a second layer-type. Each of these layer types has a range of possible values. By "range of possible values" we mean generally that there are is a range of values that may be taken. For example, a layer type may take on a values from one to ten, inclusive. That is, the layer type may have a value of one, two, three, four, five, six, seven, eight, nine, or ten. The range of possible values in this case then is nine, because there are nine possible values that the layer type may have. The first layer-type has a first range of possible values, and the second layer-type has a second range of possible values. The method also includes obtaining a first value of the first layer-type and a second value of the second layer-type. The method further includes multiplying the first value by the second range of possible values to obtain a first scaled value and adding the second value to the first scaled value to obtain a first combined priority-value. The method also includes assigning priority to the video packet based on the obtained first combined priority-value.

In another aspect, an embodiment of the invention is directed to computer-storage media storing computer-useable instructions for causing a computing device to perform a method for calculating priority for a packet of an H.264/SVC encoded video, the H.264 encoded video having a number of quality layers, a number of temporal layers, and a number of dependency layers, the packet having the identifiers of a priority_id, a dependency_id, a quality_id, and a temporal_id. These id fields indicate what layer and layer-type a packet contains. For example, a video may be coded such that there are eight total dependency layers. Each packet, then, will be assigned a dependency_id based on which dependency layer the packet is associated with. Likewise, a video may be coded such that there are multiple quality layers. Each packet, then, will be associated with a quality layer which will be indicated by the quality_id field. The temporal_id field may function similarly. The priority_id field may be utilized to indicate the overall priority of the packet.

The method includes multiplying the number of quality layers by the number of dependency layers by the dependency_id to generate a first scaled value. The method also includes multiplying the number of quality layers by the temporal_id and adding the result to the first value to generate a second value. The method still further includes adding the second value to the quality_id to the second value to generate a third value. The method also includes providing the third value as a first output signal.

A further aspect of the invention is directed to computer-storage media storing computer-useable instructions for causing a computing device to perform a method for assigning priority to a scalable video packet. The method includes having a first layer-type, a second layer-type, and a third layer-type. Each of these layer types will have a corresponding range of values—a first range of possible values, a second range of possible values, and a third range of possible values, respectively. The method includes obtaining a first value of the first layer-type, a second value of the second layer-type, and a third value of the third layer-type. The method also includes multiplying the first value by the second range of possible values by the third range of possible values to obtain a first scaled value. The method further includes multiplying the second value by the third range of possible values to obtain a second scaled value. The method still further includes adding the second scaled value to the first scaled value to obtain a first combined value. The method also includes adding the first combined value to the third value to obtain a second combined value. The method still further includes assigning priority to the video packet based on the second combined value.

BRIEF DESCRIPTION OF THE DRAWINGS

Illustrative embodiments of the present invention are described in detail below with reference to the attached drawing figures, and wherein.

DETAILED DESCRIPTION

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" or "module" etc. might be used herein to connote different components of methods or systems employed, the terms should not be interpreted as implying any particular order among or between various steps herein disclosed unless and except when the order of individual steps is explicitly described.

Embodiments of the present invention may be embodied as, among other things: a method, system, or set of instructions embodied on one or more computer-readable media. Computer-readable media include both volatile and nonvolatile media, removable and non-removable media, and contemplates media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

Embodiments of the present invention may be used to assign priority levels to video packets encoded with scalable video coding (SVC). A computing device, such as a server, personal computer, mobile device, etc, may encode a video in a scalable video coding—such as, for example, H.264/SVC. Video encoded using scalable video codings can be separated into subset bitstreams of lower bandwidth. For example, a video may have a resolution of 100 pixels by 100 pixels and a frame rate of twenty frames per second. By using SVC, the video may be encoded into multiple bitstreams or layers. A layer may be a base layer or an enhancement layer. A base layer is a necessary subset bitstream of video that is required to view a video. That is, the base layer is the layer of video with the lowest amount of video data. An enhancement layer is an optional subset bitstream of video that can be used to supplement the video quality of a base layer. A base layer is necessary to view the video, while an enhancement layer is optional and may be dropped yet the video may still be viewable at a lower quality. An enhancement layer may include various types of layers such as a spatial layer, temporal layer, quality layer, etc. A video may be coded such that there are a certain number of enhancement layers. For example, a video may be coded such that there are three spatial enhancement layers and two temporal enhancement layers. These enhancement layers may be used together or separately to allow for a video to be viewed at a higher quality.

In the above example, for instance, a spatial layer may be dropped from the video yet the video may still be viewable at fifty pixels by fifty pixels and twenty frames per second. A spatial layer generally influences the resolution of the video. Alternatively, also in the above example, a temporal layer may be dropped from the bitstream yet the video may still be viewable at 100 pixels by 100 pixels and 10 frames per second. A temporal layer generally influences the frame rate of a video stream. Or, also in the above example, a quality layer may be dropped from the bitstream yet the video may still be viewable at 100 pixels by 100 pixels and 20 frames per second but with a lower signal-to-noise ratio. A quality layer generally influences the signal-to-noise ratio of a video stream. The presence or absence of each enhancement layer may thus influence the quality of a video when decoded. Methods and systems in accordance with embodiments of the present invention may assign a priority to the enhancement layers. This may be important should an attempt be made to transmit the video over a network or other communications media. In the event that the network becomes congested, it may be important for a server or other computing device to determine which layers to transmit and which layers to drop such that the highest quality of video may reach an end user.

Figure 1:
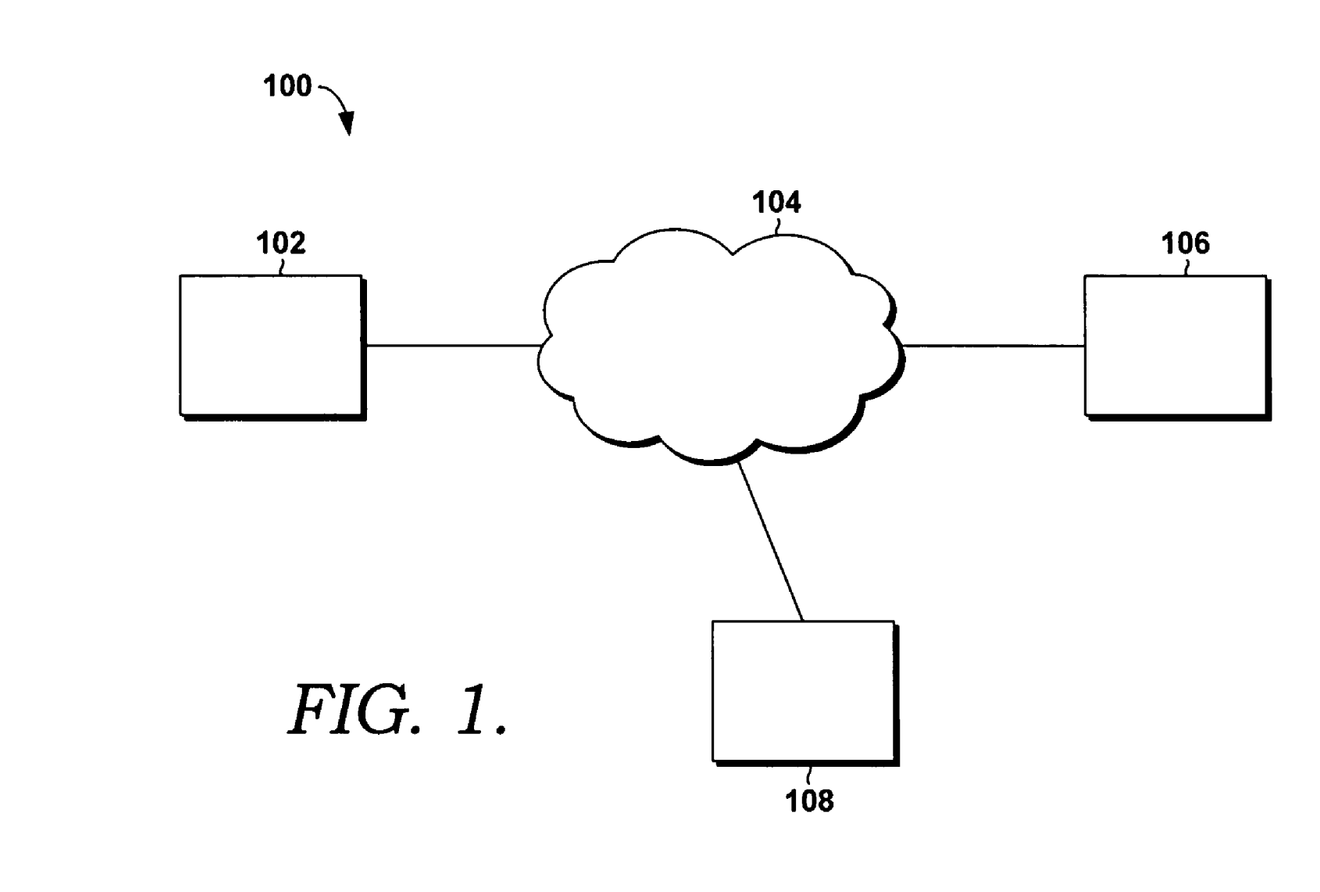
FIG. 1 illustrates an environment in accordance with embodiments of the present invention.

Having briefly described an overview of embodiments of the present invention, an exemplary environment in which embodiments of the present invention may be implemented is described below in order to provide a general context for various aspects of the present invention. Referring initially to FIG. 1 in particular, an exemplary environment for implementing embodiments of the present invention is shown and designated generally as environment 100. Environment 100 is but one example of a suitable environment and is not intended to suggest any limitation as to the scope of user or functionality of the invention.

Referring now to FIG. 1, an environment 100 of an embodiment in accordance with the present invention is provided. It should be understood that this and other arrangements described herein are set forth only as examples. FIG. 1 illustrates an environment 100 in accordance with embodiments of the present invention. Computing device 102, which may comprise a server, has video data. Computing device 102 encodes the data using H.264/SVC such that the resulting video data includes a base layer and enhancement layers. H.264/SVC is an mpeg scalable video coding that allows video to be coded into a base layer and one or more enhancement layers. Computing device 102 then packetizes and marks the video data using methods in accordance with the present invention. Computing device 102 transmits the packetized and marked video data to DiffServe-Aware Network 104. DiffServe-Aware Network 104 then transmits some or all of the packetized and marked video layers to computing device 106 and computing device 108.

For example, computing device 102 may have video data at 200 pixels by 200 pixels resolution and thirty frames per second. Computing device 102 can use H.264/SVC to encode the video into multiple bitstreams. For example, computing device 102 may encode the video data such that there is: a base layer at 100 pixels by 100 pixels and fifteen frames per second; a first enhancement layer that, if used in conjunction with the base layer, would allow the video to be presented at 200 pixels by 200 pixels and fifteen frames per second; a second enhancement layer that, if used in conjunction with the base layer, would allow the video to be presented at 100 pixels by 100 pixels and thirty frames per second; and a third enhancement layer that, if used in conjunction with the base layer and the above two enhancement layers, would allow the video to be viewed at the full 200 by 200 pixels and thirty frames per second. The first and second enhancement layers are dependent on the base layer. The third enhancement layer is dependent on the base layer and both the first and second enhancement layer. Each of the above enhancement layers can be marked with priority to indicate to DiffServe-Aware Network 104 which should be preferentially transmitted. For example, the base layer should be marked with the highest priority as it is necessary to view the video, regardless of the presence or absence of enhancement layers. The first and second enhancement layers should have a lower priority, as they are not necessary to view a lower quality depiction of the video, but each may be used in conjunction with the base layer or one or more other enhancement layers to achieve a higher quality. It should be noted that each of these layers depends on the base layer and may not be viewed in isolation therefrom. They are, in other words, dependent on the base layer. The third enhancement layer may be marked with the lowest priority as it requires the base layer and both the first and second enhancement layers to function (i.e., it is dependent on both the base layer and the first and second enhancement layers). In the case that there is network congestion, or in any instance where DiffServe-Aware Network 104 may not be able to transmit the base layer and all three enhancement layers to computing device 106 (perhaps because there is not enough bandwidth), DiffServe-Aware Network 104 may preferentially transmit the base layer only to computing device 106 because it has the highest priority. If it is able to transmit an enhancement layer in addition to the base layer, DiffServe- Aware Network 104 may transmit the enhancement layers with the highest priority. Because of these priority markings, important layers may be preferentially transmitted to computing device 106 or 108.

Figure 2A:
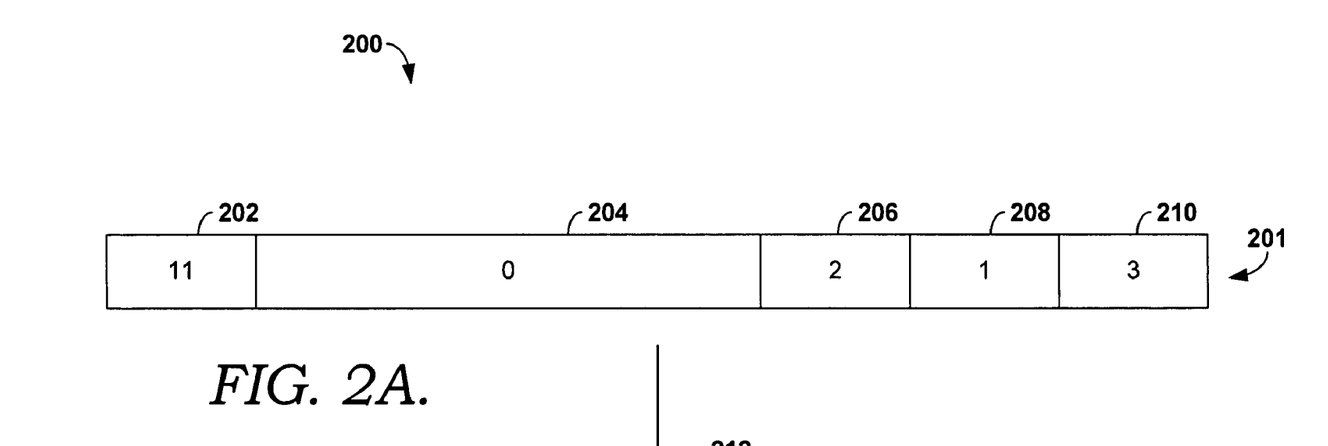
FIG. 2A illustrates a diagram of an exemplary Network Abstraction Layer (NAL) Header.

Turning now to FIG. 2, priority marking of an exemplary Network Abstraction Layer (NAL) Header is depicted 200. H.264 video data are coded into NAL units. Each NAL unit includes a header which provides information relating to the data contained in the NAL unit. SVC video data may be organized into several NAL units. Each NAL unit may, for example, include a single layer of an SVC encoded video. A NAL header may provide information regarding what is included in the NAL unit. NAL Header 201, for example, may be utilized with SVC to provide information about the encoded data. For example, NAL header 201 includes NRI field 202. NRI field 202 reflects the relative importance of this particular NAL unit. NAL header 201 also includes priority_id field 204. Priority_id field 204 provides priority information for the video data in the NAL unit. A lower priority_id may indicate a higher priority, and may, for instance, have values from zero to sixty three. NAL header 201 also includes dependency_id field 206. Dependency_id field 206 indicates the inter-layer dependency level of the SVC video data in the NAL unit and may have values, for example, from zero to seven. This dependency layer is a layer-type, and the range of possible values from this dependency layer-type is eight (since there are eight total values that this layer-type may assume: zero, one, two, three, four, five, six, or seven). NAL header 201 also includes quality_id field 208. Quality_id field 208 indicates the quality level of the SVC video data in the NAL unit, such as the signal-to-noise ratio, and may assume values, for example, from zero to fifteen. This quality_id is a quality layer-type, and may assume sixteen possible values. NAL header 201 also includes temporal_id field 210. Temporal_id field 210 indicates the temporal level of the SVC video data in the NAL unit and may have values, for example, from zero to seven. Temporal_id 210 may be associated with the frame rate, and lower values of temporal_id correspond to lower frame rates. Temporal_id is a temporal layer-type, and may assume, in this example, eight possible values. It should be noted that there may be more or less ranges of values that a given layer-type may assume, depending on the SVC encoding. The range of values of a given layer-type is not necessarily the same as the range of possible values used in the relevant field of a NAL header.

Figure 2B:
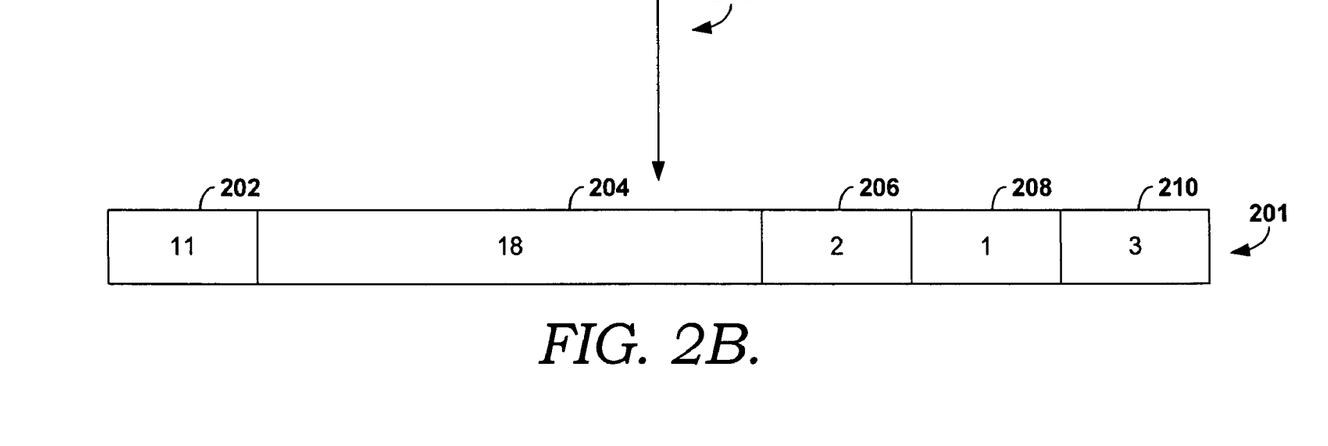
FIG. 2B illustrates another diagram of an exemplary Network Abstraction Layer (NAL) Header.

To further illustrate an embodiment in accordance with the present invention, in FIG. 2A, priority_id field 204 has a value of zero, dependency_id field 206 has a value of two, quality_id field 208 has a value of one, and temporal_id field 210 has a value of three. This indicates that the H.264/SVC video data in this NAL unit is dependant upon two layers of lower dependency (because there are two lower values that dependency_id 204 could be). This also indicates that the H.264/SVC video data in the NAL unit is dependent upon one layer with lower quality_id and three layers with lower temporal_id. NAL header 202 may be processed by method 212 in accordance with one embodiment of the present invention to calculate priority_id 204. Priority_id 204 may be calculated according to the following exemplary formula:

$$\text{priority\_id} = \text{Floor}(63/(N-1)*(Q*T*DID + Q*TID + QID))$$

where the floor function rounds down the result. 63 is the maximum number to which priority_id may be set. Q is the total number of quality layers in the SVC coded video (which in this example is sixteen). T is the total number of temporal layers in the SVC coded video (which in this example is eight). DID is the dependency layer level of the video data in this NAL unit (in this case it is two, the value of dependency_id field 206). QID is the quality layer level of the video data in this NAL unit (in this case it is one, the value of quality_id field 208). TID is the temporal layer level of the video data in this NAL unit (in this case it is three, the value of temporal_id field 210). N is the total number of combinations of quality layers, dependency layers and temporal layers of the SVC encoded video (in this case sixteen, eight, and eight, respectively). Using the above equation, priority_id 204 may be set by method 212 as eighteen, as shown by FIG. 2B.

It should be noted that the above mathematical formula may be algebraically or otherwise manipulated to achieve equivalent results. For example, the formula may be algebraically rearranged to yield the following formula, which is equivalent:

$$\text{priority\_id} = \text{Floor}(63/(N-1)*(Q*(T*DID + TID) + QID))$$

Each of these formulas and other manipulations or rearrangements are within the scope of the present invention.

Figure 3:
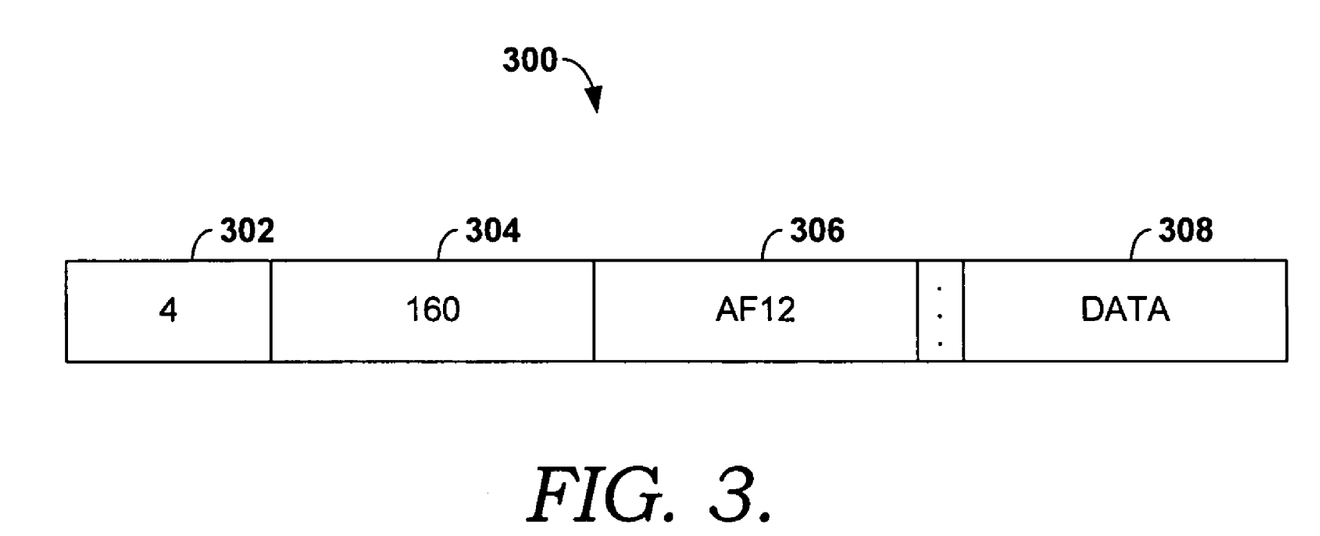
FIG. 3 is an exemplary diagram of an IP packet.

Turning now to FIG. 3, IP packet 300 is illustrated. IP packet 300 includes version field 302, header length field 304, DiffServ field 306, and data 308. Version field 302 provides information about the version of the IP packet header. In this example, it is version 4. Header length field 304 indicates the length of the IP packet header. In this, example the header is 160 bytes in length. DiffServ field 306 indicates the DiffServ priority of the IP packet. In this case, the packet is marked AF12, known as assured forwarding with medium drop. DiffServ field 306 may be marked different levels of drop priority by utilizing methods in accordance with embodiments of the present invention. In general, DiffServ field 306 indicates the priority of IP packet 300 when being transmitted via a DiffServ-Aware Network.

Figure 4:
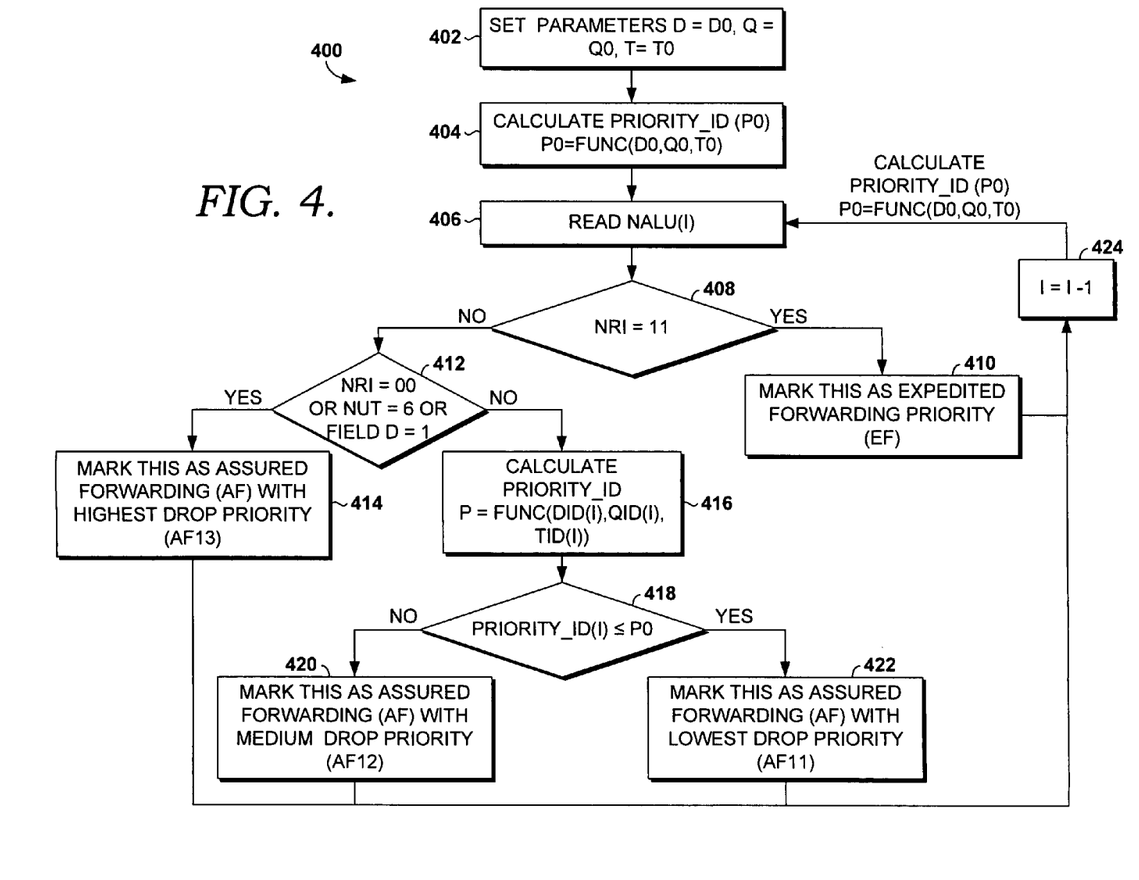
FIG. 4 is a flow diagram illustrating a method for assigning priority to a video packet implemented in accordance with the present invention.

Turning now to FIG. 4, flow diagram 400 is illustrated. Flow diagram 400 illustrates a method for marking a DiffServ field in accordance with embodiments of the present invention. At block 402, the parameters d, q, and t are set to d0, q0, and t0, respectively. At block 404, priority_id is calculated in accordance with embodiments of the present invention. At block 406, a network abstraction layer (NAL) unit is read. At block 408, NRI field is examined. NRI stands for NAL_ref_idc, and signals the importance of the NAL unit for the reconstruction process. If the NRI field equals 11, as shown at block 408, the DiffServ field is marked as Expedited Forwarding Priority (EF), as shown at block 410. If the NRI field does not equal 11, but if the NRI field equals 00 or the NUT field equals 6 or field D equals 1, as shown at block 412, the DiffServ field is marked as Assured Forwarding with highest Drop Priority (AF13), as illustrated by block 414. Otherwise, priority_id is calculated in accordance with embodiments of the present invention, as shown at block 416. Priority_id is compared to a threshold level, p0, as illustrated at block 418. If priority_id is greater than or equal to p0, the DiffServe field is marked as Assured Forwarding with lowest Drop Priodity (AF11), as shown at block 420. If priority_id is less than p0, the DiffServe field is marked as Assured Forwarding with medium Drop Priority (AF12), as shown at block 422. The process can then be iteratively repeated for a given video stream, as shown at block 424, until all packets associated with the video stream are priority marked.

Figure 5:
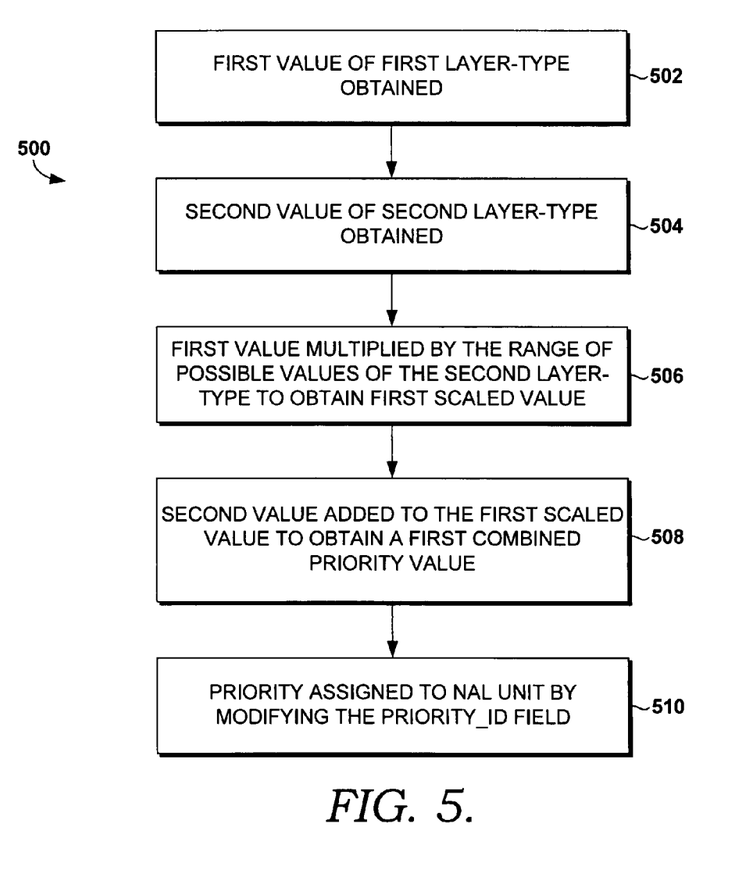
FIG. 5 is a flow diagram showing a method for assigning priority to a video packet implemented in accordance with the present invention.

Turning now to FIG. 5, a flow diagram is provided that shows a method 500 for assigning priority to a video packet. At block 502, a first value of a first layer-type is obtained. A second value of a second layer-type is also obtained, at block 504. At block 506, the first value is multiplied by the range of possible values of the second layer-type to obtain a first scaled value. As shown at block 508, the second value is added to the first scaled value to obtain a first combined priority value. As shown at block 510, priority is then assigned to a NAL unit by modifying the priority_id field.

To further illustrate, a first value of a first value-type may be obtained as shown at block 502. This may be the quality level of an SVC encoded video packet. This quality level may be, for example, eight. This value is of the quality layer-type which may have in this particular video stream, for example, ten possible values. As shown at block 504, a second value may be obtained of a second layer-type. This may be the temporal level of an SVC coded video packet. This value is of the temporal layer-type and may have twenty possible values in this particular video stream. In this case, the second value is four. As illustrated at block 506, the first value is multiplied by the range of possible values of the second layer-type to obtain a first scaled value. In this case, the first value is eight and the range of possible values of the second layer-type is twenty. Thus, the first scaled value is 160. As illustrated at block 508, the second value is added to first scaled value to obtain a first combined priority value. The second value is four and the first scaled value is 160. Thus, the first combined priority value is 164. This number is used to assign priority to the NAL unit by modifying the priority_id field. For example, the highest possible combined priority value that may used might be 328. There may also be 100 possible priority markings to assign to the NAL unit. Since 164 multiplied by 100 divided by 328 is fifty, the NAL unit would be assigned a priority of fifty.

Figure 6:
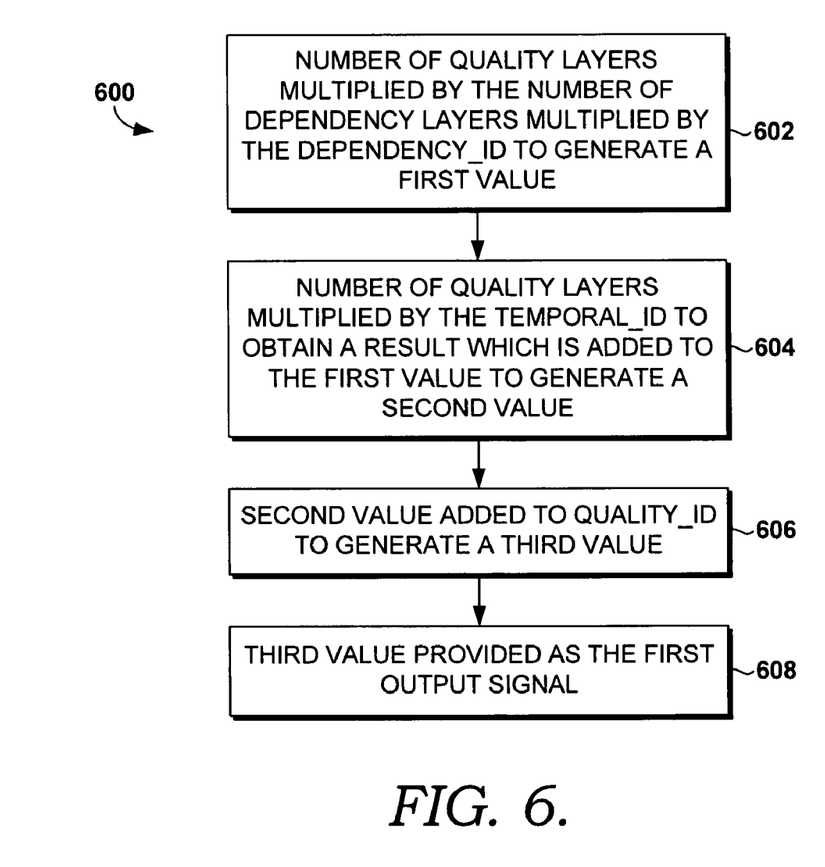
FIG. 6 is a flow diagram illustrating a method for calculating priority for a video packet implemented in accordance with the present invention.

Turning now to FIG. 6, a flow diagram is provided that provides another method 600 in accordance with embodiments of the present invention is illustrated. As shown at block 602, the number of quality layers is multiplied by the number of dependency layers is multiplied by the dependency_id to generate a first scaled value. As shown at block 604, the number of quality layers is multiplied by the temporal_id to obtain a result which is added to the first value to generate a second value. As shown at block 606, the second value is added to the quality_id to generate a third value. This third value is then provided as the first output signal, as illustrated by block 608.

For example, there may be ten quality layers and fifteen dependency layers in a given SVC encoded video. The dependency_id of a particular NAL unit may be five. These are multiplied together as shown at step 602 to generate a first value of 750. Again, there are ten quality layers, which may be multiplied by the temporal_id, in this case three, which may be added to the first value, 750, as shown at block 606, to generate a second value of 780. This second value of 780 is then added to the quality_id, in this case seventeen, in a third computer process to generate a third value of 797, as illustrated by block 610. This third value of 797 is then provided as the first output signal, as shown at block 612.

Figure 7:
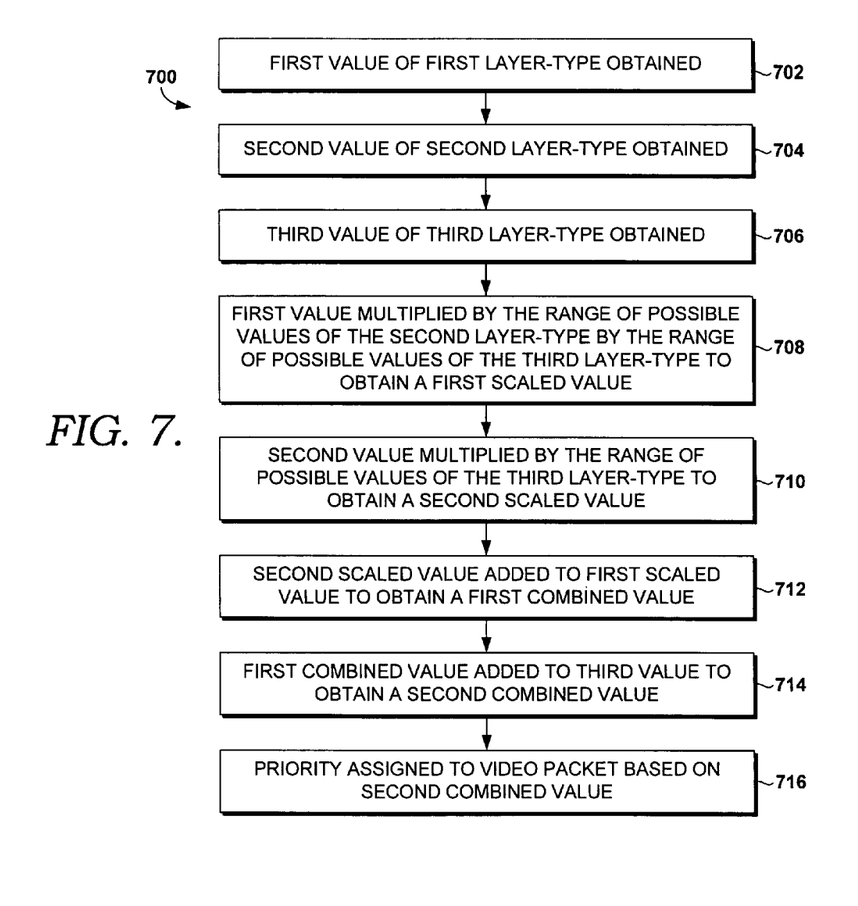
FIG. 7 is a flow diagram illustrating a method for assigning priority to a video packet implemented in accordance with the present invention.

Turning now to FIG. 7, another flow diagram is provided that shows yet another method 700 for assigning priority to a video packet. At block 702, a first value of a first layer-type is obtained. A second value of a second layer-type is obtained, as illustrated at block 704, and a third value of a third layer-type is obtained, as illustrated at block 706. At block 708, the first value is multiplied by the range of possible values of the second layer-type by the range of possible values of the third layer-type to obtain a first scaled value. As shown at block 710, the second value is multiplied by the range of possible values of the third layer-type to obtain a second scaled value. The second scaled value is added to the first scaled value to obtain a first combined value, as illustrated at block 712. As shown at block 714, the first combined value is added to the third value to obtain a second combined value. Priority is then assigned to the video packet based on the second combined value, as shown at block 716.

To further illustrate, a first value of a first value-type may be obtained as shown at block 702. This may be the dependency level of an SVC encoded video packet. This dependency level may be, for example, six. This value is of the dependency layer-type, which may, for example, have sixteen possible values in this particular video stream. As shown at block 704, a second value may be obtained of a second layer-type. This may be the temporal level of an SVC coded video packet. This value is of the temporal layer-type, which may have, for example, eight possible values in this particular video stream. In this case, the second value is two. As shown at block 706, a third value may be obtained of a third layer-type. This may be the quality level of an SVC coded video packet. This value is of the quality layer-type, which may have, for example, sixteen possible values. In this case, the third value is fourteen. As illustrated at block 708, the first value is multiplied by the range of possible values of the second layer-type by the range of possible values of the third layer-type to obtain a first scaled value. In this case, the first value is six and the range of possible values of the second layer-type (the number of possible temporal layers in this video bitstream) is eight, while the range of possible values of the third layer-type (the number of possible quality layers in this video bitstream) is sixteen. So the first scaled value is six multiplied by eight multiplied by sixteen, or 768. As illustrated at block 710, the second value, two, is multiplied by the range of possible values of the third layer-type (the number of possible quality layers, sixteen) to obtain a second scaled value. So this second scaled value is sixteen multiplied by two, or thirty two. As shown at block 712, the second scaled value of thirty two is added to the first scaled value of 768 to obtain a first combined value of 800. This first combined value of 800 is added to the third value of fourteen to obtain a second combined vale of 814. This second combined value is used to assign priority to the video packet. For example, the highest possible combined priority value that may used in this case is sixteen multiplied by eight multiplied by sixteen, or 2048, because there are sixteen possible dependency layers, eight possible temporal layers, and sixteen possible quality layers. There may also be sixteen possible priority markings to assign to the video packet. Since 814 multiplied by sixty four divided by 2048 and rounded down to the nearest integer is twenty five, this video packet would be assigned a priority of twenty five.

In another example in illustration of the method 700, a first value of a first value-type may be obtained as shown at block 702. This may be the dependency level of an SVC encoded video packet. This dependency level may be, for example, five. This value is of the dependency layer-type, which may, for example, have eight possible values. As shown at block 704, a second value may be obtained of a second layer-type. This may be the quality level of an SVC coded video packet. This value is of the quality layer-type, which may have, for example, sixteen possible values. In this case, the second value is five. As shown at block 706, a third value may be obtained of a third layer-type. This may be the temporal level of an SVC coded video packet. This value is of the temporal layer-type, which may have, for example, eight possible values. In this case, the third value is six. As illustrated at block 708, the first value is multiplied by the range of possible values of the second layer-type by the range of possible values of the third layer-type to obtain a first scaled value. In this case, the first value is five and the range of possible values of the second layer-type (the number of possible quality layers in this video bitstream) is sixteen. The range of possible values of the third layer-type (the number of possible temporal layers in this video bitstream) is eight. So the first scaled value is five multiplied by sixteen multiplied by eight, or 640. As illustrated at block 710, the second value, five, is multiplied by the range of possible values of the third layer-type (the number of possible temporal layers, eight)—to obtain a second scaled value of forty. As shown at block 712, the second scaled value of forty is added to the first scaled value of 640 to obtain a first combined value of 680. This first combined value of 680 is added to the third value of six to obtain a second combined vale of 686. This second combined value is used to assign priority to the video packet. For example, the highest possible combined priority value that may used in this case is eight multiplied by sixteen multiplied by eight, or 1024, because there are eight possible dependency layers, sixteen possible quality layers, and eight possible temporal layers. There may also be sixty four possible priority markings to assign to the video packet. Since 686 multiplied by sixty four and divided by 1024 and rounded down to the next nearest integer is forty two, this video packet would be assigned a priority of forty two.

It should be noted that by this method the different values are accorded different weights. In the above example, since the first value is multiplied by the range of possible values of the second type and the range of possible values of the third type to obtain a first scaled value, this first scaled value will always be the most important value when added to the other scaled values. This is because this value will always be larger than the other scaled values because it is multiplied by the range of possible values. The second value is multiplied by the range of possible third values to generate a second scaled value. This second scaled value will always be smaller—and so less important—than the first scaled value, but will always be larger than the third value, and so more important. It will always be larger than the third value because it was multiplied by the range of possible values of the third layer-type. Thus these three values may be combined such that there is no overlap among the first, second, and third values in the second combined value.

It should further be noted that different layer-types may be weighted more or less for the final priority determination according to a number of manners. For example, the particular video stream that is being transmitted may be of a sporting event. It may be determined that temporal layers are particularly important to achieving acceptable video quality for sporting events. The temporal layers might thus be the second layer-type in method 700—accorded more weight in the final priority marking than the quality layers. Or, for example, an end-user may be using a computing device with a particular size or type of screen. It may not be necessary to transmit this particular user higher spatial layers. Spatial layers may thus be weighted less when determining the final priority such that temporal layers may be preferentially transmitted by a Diff-Serve-Aware Network. There may be any number of such factors that go into the final determination of which layer-types should be weighted more than others.

Many different arrangements of the various components depicted, as well as components not shown, are possible without departing from the scope of the claims below. Embodiments of our technology have been described with the intent to be illustrative rather than restrictive. Alternative embodiments will become apparent readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

What is claimed is:

1. One or more computer-storage media not being a signal per se storing computer-useable instructions for causing a computing device to perform a method for assigning priority to a video packet, the video packet being associated with a scalable video coding, the scalable video coding having a first layer-type and a second layer-type, the method comprising:
   implementing the first layer-type, the first layer-type having a first range of possible values;
   implementing the second layer-type, the second layer-type having a second range of possible values;
   obtaining a first value, the first value being of the first layer-type;
   obtaining a second value, the second value being of the second layer-type;
   multiplying the first value by the second range of possible values to obtain a first scaled value;
   adding the second value to the first scaled value to obtain a first combined priority-value;
   wherein the video packet comprises H.264/SVC encoded video, and wherein the video packet comprises a network abstraction layer, the network abstraction layer comprising a priority_id field, a dependency_id field, a temporal_id field, and a quality_id field;
   assigning priority to the video packet based on the first combined priority-value, wherein assigning priority to the video packet comprises modifying the priority_id field;
   determining based on comparing the priority_id to a threshold to mark an IP packet associated with video packet as Assured Forwarding with medium Drop Priority (AF12); and
   marking the IP packet as Assured Forwarding with medium Drop Priority (AF12).

2. The media of claim 1, wherein the obtaining the first value comprises analyzing the dependency_id field.

3. The media of claim 1, wherein obtaining the second value comprises analyzing the quality_id field.

4. The media of claim 1, wherein obtaining the second value comprises analyzing the temporal_id field.

5. One or more computer-storage media not being a signal per se storing computer-useable instructions for causing a computing device to perform a method for calculating priority for a packet of an H.264/SVC encoded video, the H.264 encoded video having a number of quality layers, a number of temporal layers, and a number of dependency layers, the packet having a priority_id, a dependency_id, a quality_id, and a temporal_id, the method comprising:
   multiplying the number of quality layers by the number of dependency layers by the dependency_id to generate a first scaled value;
   multiplying the number of quality layers by the temporal_id to obtain a result and adding the result to the first value to generate a second value;
   adding the second value to the quality_id to the second value to generate a third value;
   providing the third value as a first output signal;
   multiplying the number of dependency layers by the number of quality layers by the number of temporal layers to generate a fourth value;
   subtracting 1 from the fourth value to generate a fifth value;
   dividing 63 by the fifth value to generate a sixth value;
   multiplying the sixth value by the third value to generate a seventh value; and providing the seventh value as a second output signal
rounding down the seventh value to generate an eighth value; and
providing the eighth value as a third output signal.

6. The media of claim 5, further comprising:
storing the eighth value in the priority_id field; and
providing the priority_id field as a fourth output signal.

7. One or more computer-storage media not being a signal per se storing computer-useable instructions for causing a computing device to perform a method for assigning priority to a scalable video packet, the method comprising:
providing a first layer-type, the first layer-type having a first range of possible values;
providing a second layer-type, the second layer-type having a second range of possible values;
providing a third layer-type, the third layer-type having a third range of possible values;
obtaining a first value, the first value being of the first layer-type;
obtaining a second value, the second value being of the second layer-type;
obtaining a third value, the third value being of the third layer-type;
multiplying the first value by the second range of possible values by the third range of possible values to obtain a first scaled value;
multiplying the second value by the third range of possible values to obtain a second scaled value;
adding the second scaled value to the first scaled value to obtain a first combined value;
adding the first combined value to the third value to obtain a second combined value;
wherein the video packet comprises H.264/SVC encoded video, and wherein the video packet comprises a network abstraction layer, the network abstraction layer comprising a priority_id field, a dependency_id field, a temporal_id field, and a quality_id field
assigning priority to the video packet based on the second combined value, wherein assigning priority to the video packet comprises modifying the priority_id field;
determining based on comparing the priority_id to a threshold to mark an IP packet associated with the video packet as Assured Forwarding with lowest Drop Priority (AF11); and
marking the IP packet associated with the video as Assured Forwarding with lowest Drop Priority (AF11).

8. The media of claim 7, wherein obtaining the first value comprises analyzing the dependency_id field.

9. The media of claim 8, wherein obtaining the second value comprises examining the quality_id field.

10. The media of claim 9, wherein obtaining the third value comprises analyzing the temporal_id field.

11. The media of claim 9, wherein obtaining the third value comprises analyzing the quality_id field.

12. The media of claim 8, wherein obtaining the second value comprises analyzing the temporal_id field.

* * * * *